United States Patent
Altmann et al.

[11] 3,946,438
[45] Mar. 23, 1976

[54] MAGNETIC CARD TRANSPORT

[75] Inventors: Bert Lane Altmann; Robert Milton Gregg, both of Chicago; Norman Frank Gioia, Lombard, all of Ill.

[73] Assignee: Victor Comptometer Corporation, Chicago, Ill.

[22] Filed: Apr. 1, 1974

[21] Appl. No.: 456,525

[52] U.S. Cl. .......................... 360/88; 235/61.11 D
[51] Int. Cl.² ..................... G11B 19/02; G06K 7/01
[58] Field of Search ......... 360/2, 109, 104, 88, 130; 235/61.11 D; 271/3

[56] References Cited
UNITED STATES PATENTS

| | | | |
|---|---|---|---|
| 3,176,084 | 3/1965 | Pollaschek | 360/109 |
| 3,235,265 | 2/1966 | Morrison et al. | 360/130 |
| 3,337,213 | 8/1967 | Barre | 271/3 |
| 3,419,262 | 12/1968 | Davis et al. | 271/3 |
| 3,646,325 | 2/1972 | George | 360/88 |
| 3,704,360 | 11/1972 | McFadden | 235/61.11 R |
| 3,761,075 | 9/1973 | Van Namen | 271/3 |
| 3,780,377 | 12/1973 | Osgood | 360/88 |
| 3,800,323 | 3/1974 | Jenkins | 360/109 |
| 3,810,238 | 5/1974 | Staar | 360/88 |
| 3,831,188 | 8/1974 | Zupancic et al. | 360/2 |
| 3,840,223 | 10/1974 | Nakata | 235/61.11 D |

*Primary Examiner*—Robert S. Tupper
*Attorney, Agent, or Firm*—McCaleb, Lucas & Brugman

[57] ABSTRACT

A magnetic card transport comprising the combination of a frame having curved guide path means for a card to insure effective but minimal reading pressure of card against a magnetic head (transducer) resulting only from flexure of the card by rigidly mounting the head on the convex or rear side of the frame, and novel card translating means including a self-pivoting drive shaft with a driven roller at one end and a curved card-driving roller at center carried by a bracket pivotally mounted on the frame for movements between inoperative and operative positions and having a pivotal half-bearing to insure angular movement of the shaft axis in response to forward or reverse rotation of the driven roller to maintain proper engagement of the card with the frame, and a stop to limit manual card insertion to a start position and movable to inoperative position as the shaft-supporting bracket is swung to its operative position to effect rotation of the driven roller.

As forward rotation of the motor is initiated, a solenoid is energized to swing the shaft-supporting bracket to operative position, and optical sensing means are provided for cooperation with a hole pattern in the card to cause reversal of the motor, when the card has reached its desired innermost extent of travel, and deenergization of the motor and the solenoid when the card has reached the end of its useful travel and been returned to start position, thus detecting card presence and point of drive reversal, providing record protection, and preventing operation when card is improperly inserted.

Novel head-supporting bracket is mounted on the frame for engagement by three screws adjustable to independently rotate the bracket and head about three mutually perpendicular axes to assure accurate positioning of the head relative to the guide path means and a card traveling therethrough.

12 Claims, 14 Drawing Figures

U.S. Patent   March 23, 1976   Sheet 1 of 5   3,946,438
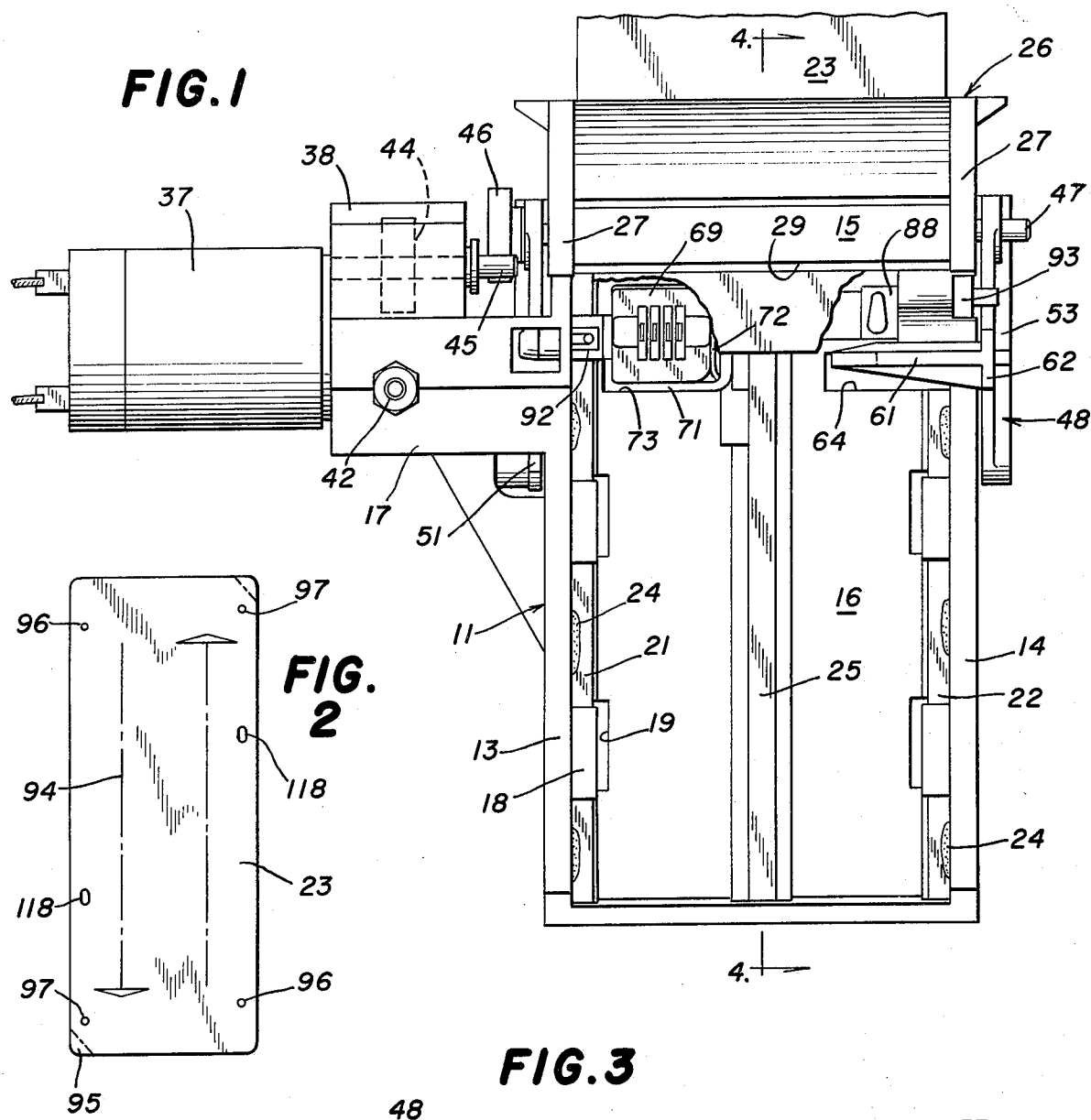
FIG. 1
FIG. 2
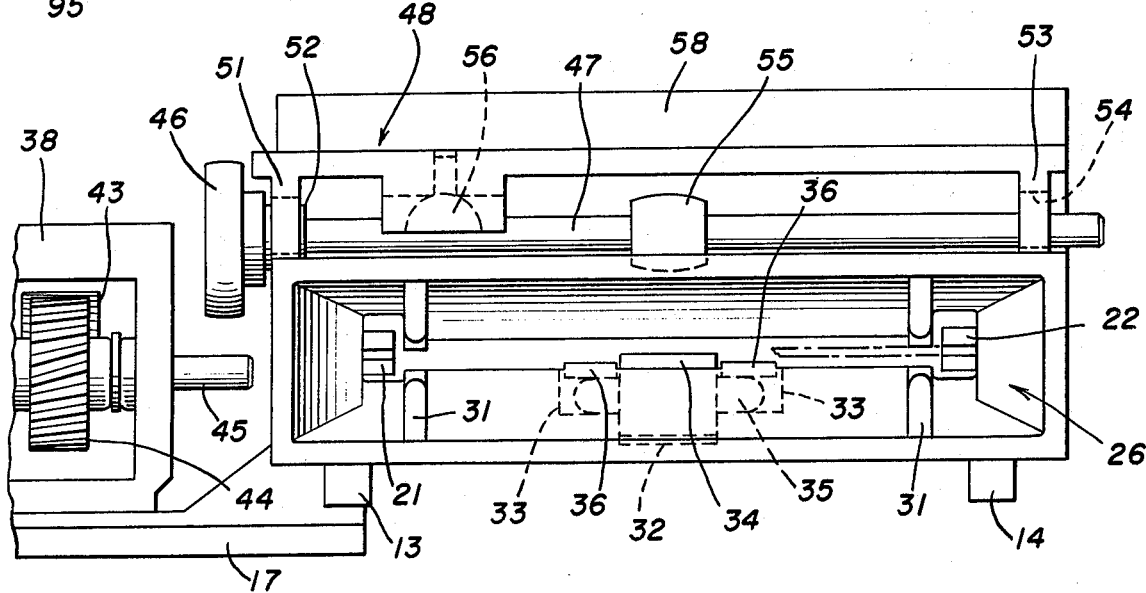
FIG. 3

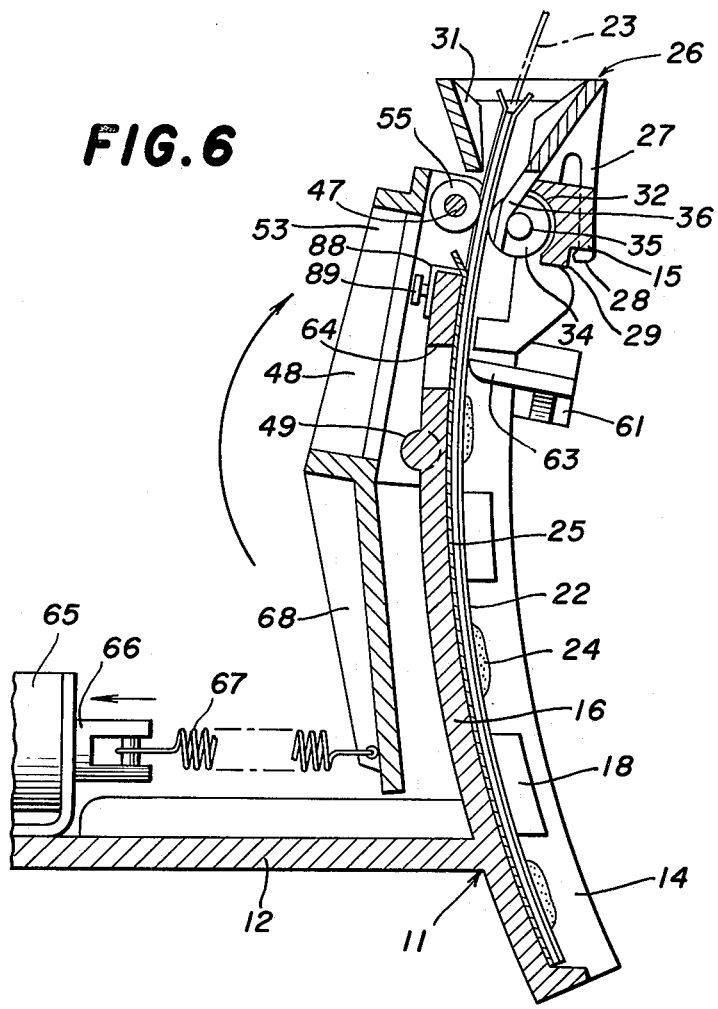
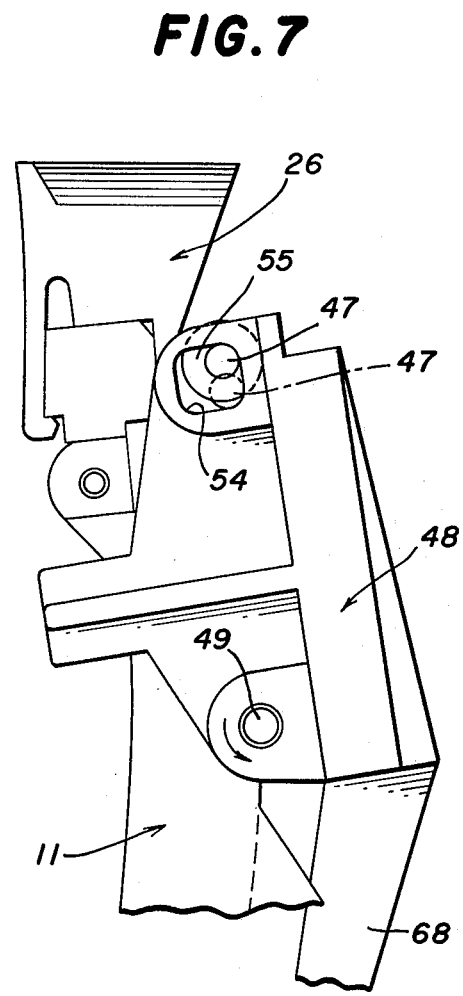
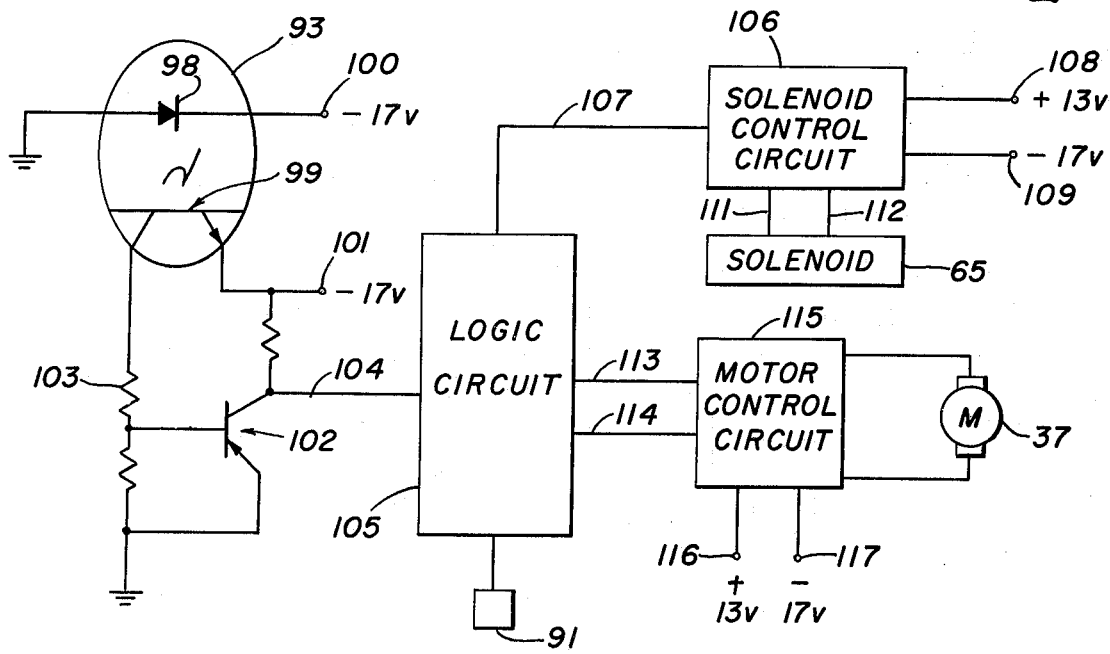

MAGNETIC CARD TRANSPORT

BACKGROUND OF THE INVENTION

1. Field of the Invention

This invention relates generally to handling of magnetic cards, and more particularly to apparatus for transporting a flat flexible magnetic card past a magnetic head or electro-magnetic transducer and insuring effective low pressure contact between, and accurate alignment of, the card and the head.

2. Description of the Prior Art

Prior magnetic card handling systems generally handle the cards flat and employ a pressure roller or spring-urged pad on the opposite side of the card from the transducer or magnetic head to apply pressure between the latter and the card. While the device of U.S. Pat. No. 3,495,222 employs curved guides 114, 115, such are merely for directing a card 150 manually inserted in the inlet 113 and downwardly into the constantly rotating drive rollers to an outlet 114 conveniently located for the operator, since the card direction of travel is not reversed. That device maintains the magnetic head 129 spring-urged in engagement with the card so that, like the other prior systems, such spring pressure results in excessive wear. Unlike the machine of U.S. Pat. No. 3,495,222, other prior art devices effect reversal of the direction of travel of each card to provide an automatic two stage power driven cycle, such as that of U.S. Pat. No. 3,337,213, with the return path of the card, however, being different than that during its initial movement. In some prior devices proper registration of the magnetic card with the head or transducer is attained by the application of pressure against a longitudinal edge of the card to engage the opposite edge with a guide, as by a spring-urged ball, but that also is a source of excessive wear. In U.S. Pat. No. 3,752,962 card alignment with respect to successively passed, read and write heads in a unidirectional movement is effected by an endless belt for transporting the card that is skewed at an angle to a fixed linear card guide. And another prior device of interest is disclosed in U.S. Pat. No. 3,671,719 which imparts inward and reverse or return movements to a card, although in different paths, and effects edge engagement of the card with a guide by means of resilient cup-shaped rollers having wedge-shaped cuts in their annular peripheries to produce a plurality of radially projecting flexible teeth which engage the card, on its upper surface during inward movement, on its trailing edge to drive the card from one side to the other of its path preparatory to initiation of return or outward card movement, and on the under surface of the card to continue that return after the card movement has been reversed by rebounding of a leaf spring struck by the initially leading edge of the card.

SUMMARY OF THE INVENTION

This invention provides a magnetic card transport for effecting a two stage power driven cycle comprising inward movement of the card, after proper manual insertion of the card against a stop, by translating means in a curved path determined by guide means to flex the card to maintain an effective low contact pressure of the card against a rigidly-mounted magnetic head solely by the guide means and the flexed card, and automatic reverse or outward movement of the card in the same curved path in the opposite direction while properly registering the card with the head throughout the cycle without appreciable card surface or edge wear. Maximum life thereby is assured for the card and the transport mechanism, jittering movements between the card and the head are substantially eliminated, and the cost of manufacturing this simplified transport is minimized in comparison to the prior devices.

The novel card translating means includes a curved card-driving roller on a shaft having a driven roller on one end and extending through enlarged apertures in a pivotally mounted shaft-supporting or drive transmission bracket having a half-bearing defining pivot for the shaft, motor-driven drive means, and means for swinging the bracket to engage the driven roller with the drive means, the direction of rotation of the motor causing restricted pivoting of the shaft on the half-bearing to properly position the axis of the curved roller to maintain the same edge of the card against the guide means during both longitudinal directions of travel of the card to insure accurate registration with the head. The drive transmission bracket includes a card insertion stop which is automatically moved out of the path of the card, if the card has been properly manually positioned, as the bracket is swung to effect rotation of the shaft. A hole pattern in the card cooperates with optical switch or light sensor means as a motor control to effect reversal of the motor when the card has completed its inward movement and deenergization of the motor when the card has reached the end of its useful travel.

The magnetic head is rigidly mounted in a bracket and fine adjustments of the latter may be effected independently about three mutually perpendicular axes to assure perfect alignment or orientation of the head with respect to a card flexed by the curved guide means.

In the drawings:

FIG. 1 is a front elevation of a magnetic card transport embodying the invention with a card inserted in starting position against a stop and having its lower left corner broken away to show the magnetic head and the left side optical switch, and its lower right corner broken away to show a card backing pad;

FIG. 2 is a reduced view of a card face;

FIG. 3 is a top plan view of a portion of FIG. 1 without the card and on an enlarged scale;

FIG. 6 is a sectional view like FIG. 4 showing the card-driving roller and supporting bracket in forward operative position;

FIG. 7 is an end view like FIG. 5 showing the shaft-supporting bracket in its forward operative position, with the driving roller shaft in full lines in the position assumed during downward movement of the card and in broken lines in the position assumed during upward or return movement of the card;

FIG. 14 is a simplified circuit diagram.

DESCRIPTION OF THE PREFERRED EMBODIMENT

Figure 4:
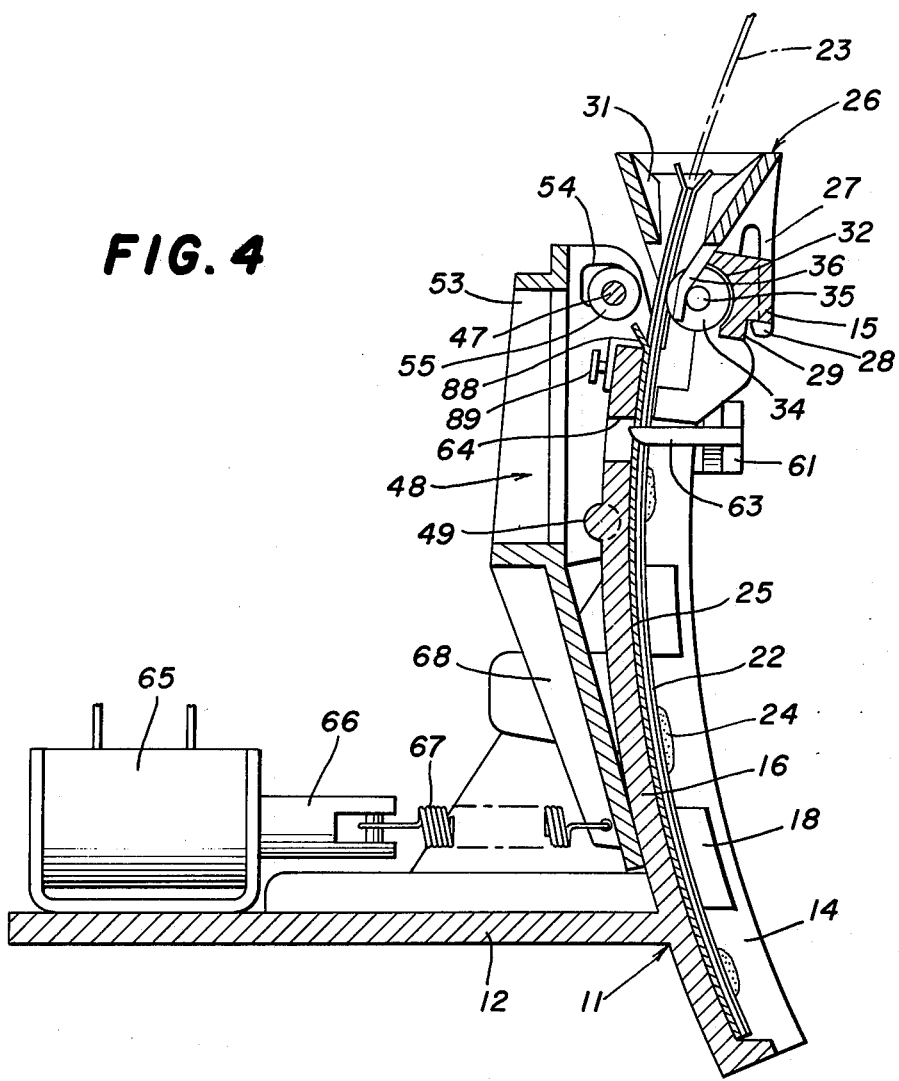
FIG. 4 is a vertical section taken substantially on the line 4—4 of FIG. 1 showing the card-driving roller and supporting bracket in rearward inoperative position.

As illustrated herein, the magnetic card transport comprises a frame indicated generally by reference numeral 11 which is a unitary molding made of a suitable plastic, such as the glass-filled phenolic marketed by Fiberite Corporation under the designation FIBERITE FM4009, that includes a base 12, vertical right and left side walls 13 and 14, respectively, a horizontal head bar 15 joining the upper ends of the latter and extending forwardly therefrom, a vertically curved web 16 extending transversely between the side walls 13, 14 as a segment of a preferably cylindrical ring, and a motor-supporting shelf 17 extending outwardly from the left side wall 13.

As best seen in FIGS. 1 and 4, the side walls 13 and 14 have inwardly extending guide lugs 18 spaced slightly forwardly from the curved web 16, and the latter is provided with apertures 19 (FIG. 1) inwardly from those lugs to facilitate molding, with the uppermost apertures 19 also functioning to pass light for optical sensing means, as later described. Left and right curved guide means 21 and 22, respectively, preferably in the form of stainless steel channels, are disposed between the web 16 and the lugs 18 facing inwardly and having their upper ends (FIGS. 3 and 4) split and flared to guide and facilitate entrance of a magnetic card 23 therebetween. These guide channels 21, 22 are secured to the side walls 13 and 14, respectively, preferably by a suitable epoxy at 24 spaced locations along their lengths. A center guide strip 25 also is attached to the front face of the web 16 by epoxy, or the like, with its forward surface in substantially the same cylindrical plane as the rear inner surfaces of the edge guides 21 and 22.

As shown in FIGS. 1 and 3–5, a separate card funnel or loader, indicated generally by reference numeral 26, is molded from a suitable plastic, such as polypyropolene, for snap-fitting engagement on the upper end of the frame 11, as by means of depending integral legs 27 at its four corners (FIGS. 1, 4 and 5) having feet 28 engageable in grooves 29 along the front and rear lower edges of the horizontal head bar 15. The interior of the funnel 26 comprises a trough with downwardly and inwardly sloping walls, the end ones engaging the outer edges of the upstanding upper ends of the left and right guide means 21 and 22, and the longitudinal ones having guide ribs 31 for directing the lower end of a card 23 accurately into the upper ends of the curved guide means 21, 22. The rear surface of the head bar 15 is provided with a central semi-cylindrical recess 32 (FIG. 4) having a smaller communicating and coaxial recess 33 (FIG. 3) at each side for receiving a backing roller 34 and the ends of a stud shaft 35 on which it is mounted. The card funnel 26 has a pair of laterally spaced fingers 36 depending therefrom for closing the recess 33 when the funnel is mounted on the head bar to retain the backing roller 34 in place.

Figure 12:
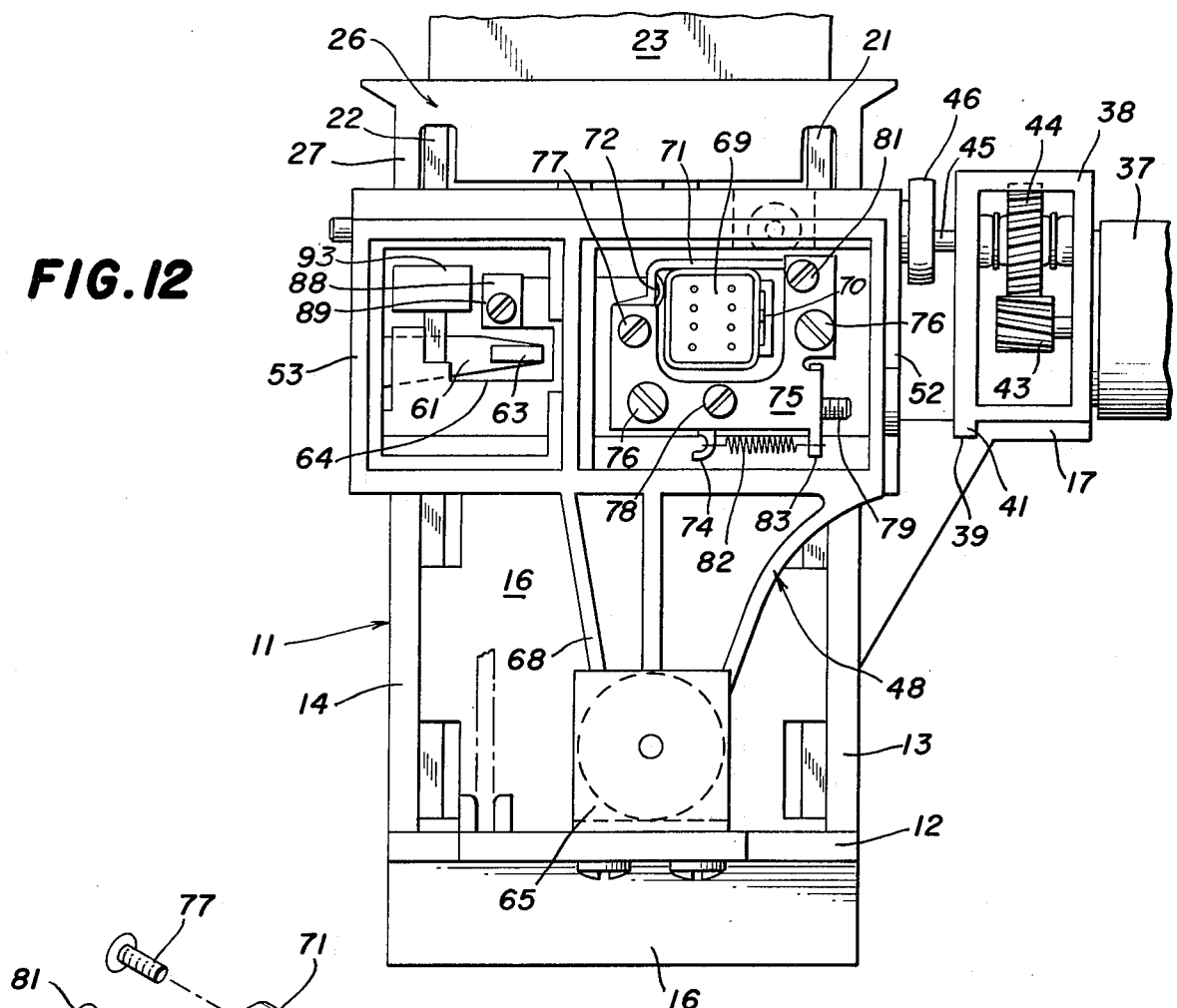
FIG. 12 is a rear elevation with the wiring omitted.

Card translating means for moving the card 23 along the curved path defined by the web 16 and guide means 21, 22 includes a reversible motor 37, preferably D.C. with a low inertia rotor, mounted on a plastic gear box 38 which is supported on the shelf 17 of frame 11 in any suitable manner. As shown in FIG. 12, the upper horizontal surface of the shelf 17 has a groove 39 for receiving a rib or flange 41 on the gear box 38, and the latter is secured to a vertical portion of shelf 17 (FIG. 13) by a bolt and nut 42 (FIG. 1). A pinion gear 43 (FIGS. 3 and 4) is mounted on the shaft of the motor 37 which meshes with a gear 44 mounted upon and secured to a capstan shaft 45 supported by suitable bearings in the side walls of the gear box 38. Since the inner end of the capstan shaft 45 is a driving member, its peripheral surface is slightly roughened, as by sandblasting.

Figure 5:
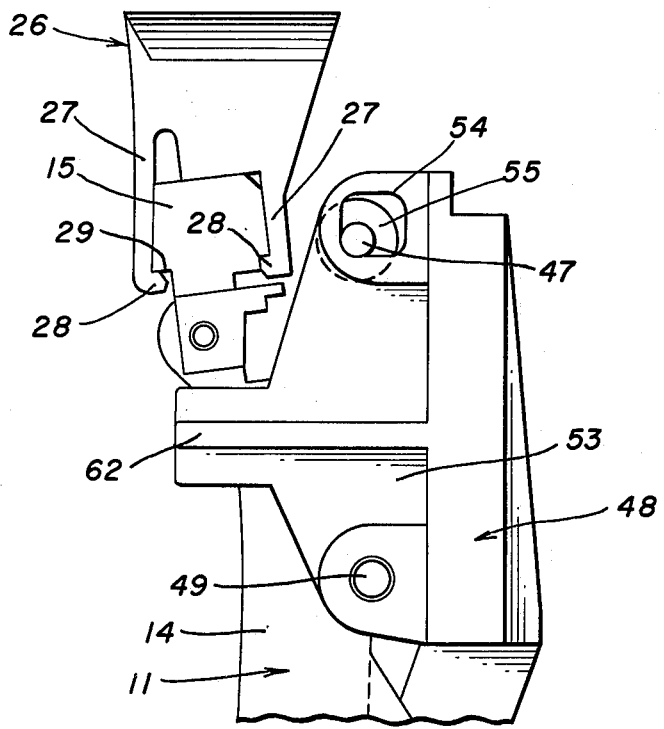
FIG. 5 is an end view of the upper part of the transport as seen from the right side of FIG. 1 showing the shaft-supporting bracket in the rearward inoperative position of FIG. 4.
Figure 8:
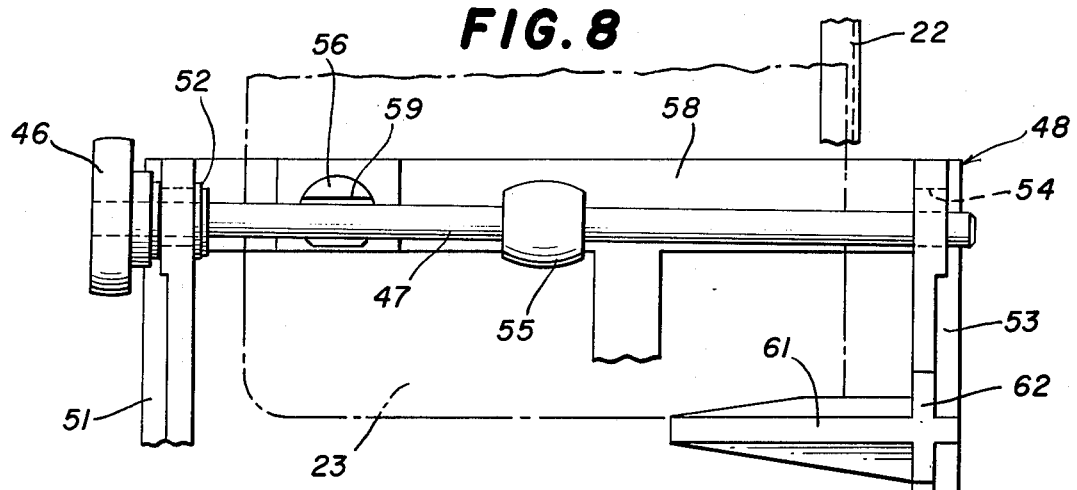
FIG. 8 is a detail front elevation of the shaft-supporting bracket in its inoperative position of FIG. 4 showing the shaft horizontal.
Figure 9:
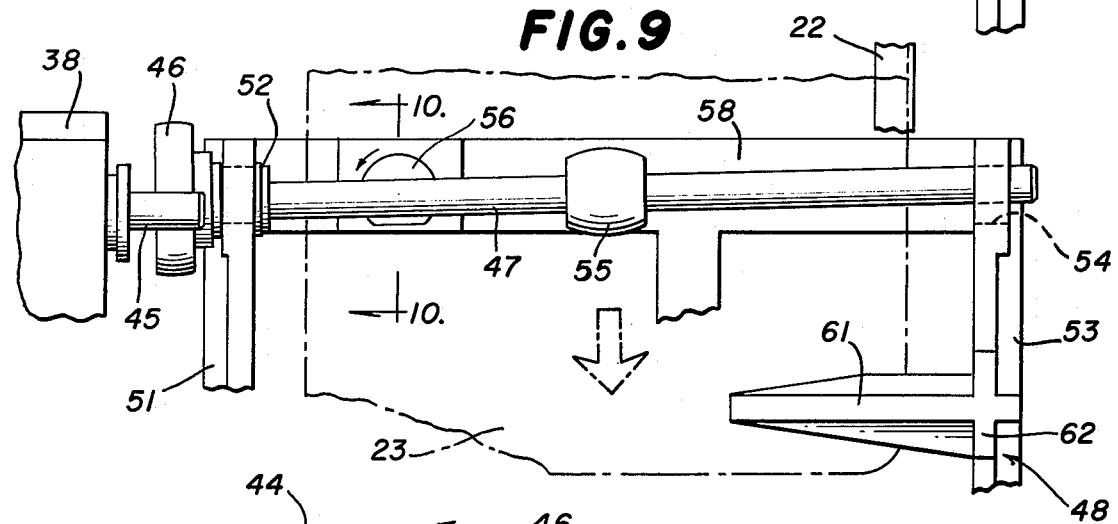
FIG. 9 is a view like FIG. 8 after movement of the shaft-supporting bracket to its operative position of FIG. 6 showing the shaft tilted about a half-bearing with its right end up and down at its left end that carrys the driven roller.
Figure 10:
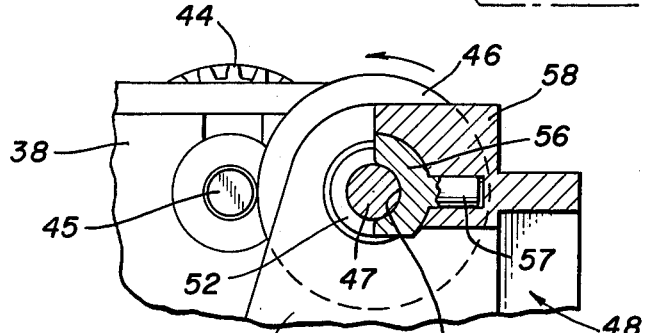
FIG. 10 is a detail vertical section taken substantially on the line 10—10 of FIG. 9 through the half-bearing and showing the driven roller engaging the capstan drive shaft.

The card translating means further includes a driven roller 46, preferably plastic with a urethane tire on its periphery, which is secured in any suitable manner on the left end of a pressure or driving roller shaft 47 (FIGS. 3 and 8–11) for cooperation with the capstan shaft 45. The shaft 47 is rotatably supported in the upper portion of a bracket 48 pivotally mounted intermediate its ends on suitable horizontal stud shafts 49 on the side walls 13, 14 of frame 11 (FIGS. 4–7). The left side 51 of the bracket 48 has a substantially rectangular aperture 52 for receiving a plastic bearing or washer mounted on the shaft 47 adjacent and inwardly of the driven roller 46 (FIGS. 3, 8, 9 and 11) and held in place by suitable retaining rings. Thus, in addition to being freely rotatable relative to the bracket 48, the shaft 47 supported by it may tilt limitedly while being prevented from escaping longitudinally from the bracket. As best seen in FIGS. 4, 5 and 7, the right side 53 of bracket 48 has a substantially square aperture 54, preferably with rounded corners, which receives and limits tilting movements of the right end of shaft 47. Mounted on the central portion of shaft 47 in alignment with the backing roller 34 is a pressure or driving roller 55 which also is plastic with a tire, preferably of urethane, having a curved or segmentally spherical outer or peripheral surface. As best seen in FIGS. 3 and 8–11, a half-bearing 56 molded from a suitable plastic having a substantially hemispherical outer surface and a rearwardly extending cylindrical stud 57 is mounted in a complementally shaped recess in the forward surface of an upper transverse portion 58 of the bracket 48 at a point between the left side 51 and the driving roller 55. A bearing recess 59 (FIGS. 8 and 10) in the forward end surface of this half-bearing 56 cooperates with the driving roller shaft 47 in a manner to be described later to accommodate tilting of the shaft to effect engagement of the right edge of a card being moved by the driving roller 55 with the right guide means 22 regardless of whether the card translation is downward or upward.

The shaft-supporting bracket 48 normally is in its inoperative position of FIGS. 3–5, 8 and 12 wherein its upper end is disposed rearwardly to space the driven roller 46 from the capstan shaft 45 and the driving roller 55 from a card that may have been inserted into the guide means 21, 22. A card stop is molded integrally with the bracket 48 which comprises an inward extension 61 (FIGS. 1 and 8) from a forward portion 62 (FIGS. 5 and 8) of the right side 53 and a rearwardly extending finger 63 (FIG. 4). The web 16 is provided with an aperture 64 (FIGS. 1, 4, 12 and 13) to accommodate the end of the finger 63 when the bracket is disposed in its inoperative position wherein the finger 63 is in operative position in the path of movement of a card 23 in the guide means 21, 22 to limit downward movement of a card manually inserted therein through the funnel 26.

Means are provided for swinging the upper end of the bracket 48 forwardly (to the right in FIG. 4 to its operative position of FIG. 6) to render the card stop 63 ineffective and to engage the driven roller 46 with the capstan shaft 45 and the driving roller 55 with the rear surface of the card 23 opposite the backing roller 34. This means comprises a solenoid 65 mounted in any suitable manner on the frame base 12 with its normally extended plunger 66 connected by a coil spring 67 to a lower end 68 of the shaft-supporting bracket 48. As will readily be apparent, energizing the solenoid to cause retracting of its plunger 66 will pull the lower end 68 of bracket 48 rearward through the agency of the spring 67 to resiliently effect engagement of driven roller 46 with capstan shaft 45 and driving roller 55 with the inserted card to move the latter downward past a magnetic head or transducer 69 which is mounted, as shown in FIGS. 1 and 12, for constant but low pressure engagement with the rear or convex surface of the card.

Figure 13:
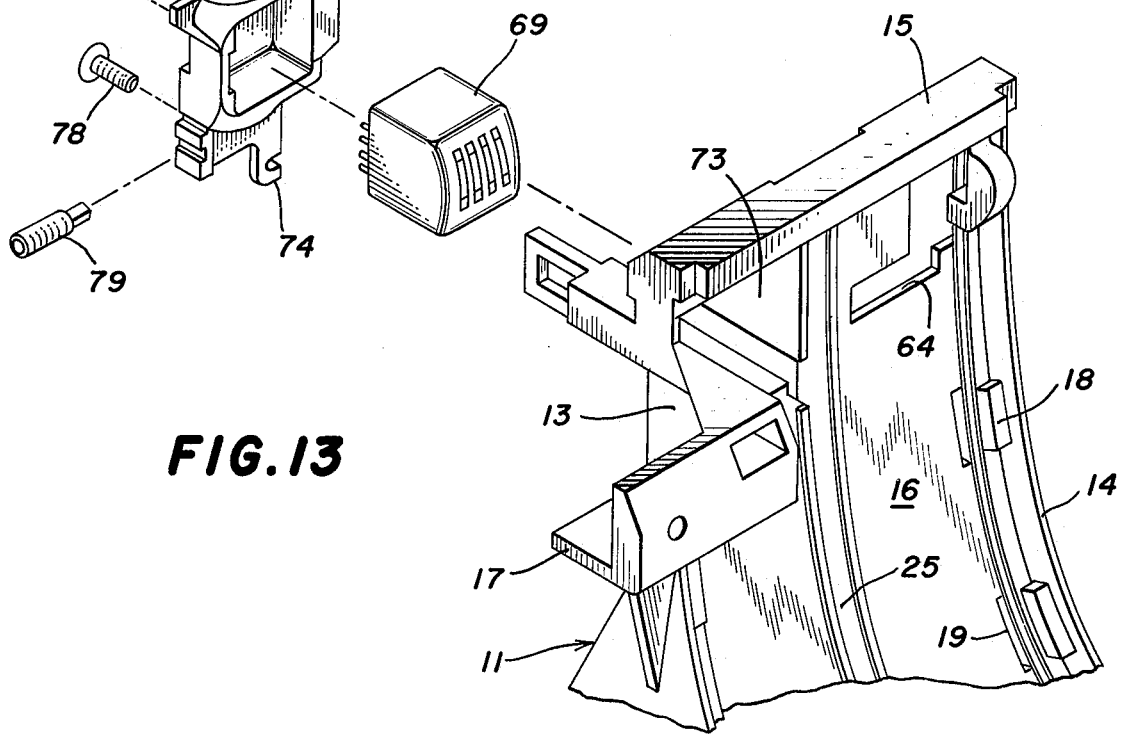
FIG. 13 is an exploded view in perspective to show the adjustable mounting of the magnetic head.

As previously noted, such contact is effected solely by the flexure of a card 23 as applied by the curved guide means 21, 22, so it is essential that fine and accurate adjustment of the operative face of the head 69 relative to the curved pathway of the card be available during assembly or mounting of the head on the frame 11. To this end, the head 69 is mounted in a bracket 71, as best seen in FIG. 13, preferably with a leaf spring 72 interposed between that bracket and the right side of the head as shown at the left side in the rear view of FIG. 12. A shim or wedge 70 is slid between the head 69 and the bracket 71 at the side opposite spring 72 to enable accurate lateral positioning of the head in the bracket, different wedges being tried in each assembly on a trial and error basis until proper positioning of the head relative to the side guide 22 is attained. A flanged aperture 73 through the upper left hand portion of the web 16 of frame 11 (FIGS. 1 and 13) receives the bracket 71 which has a depending hook 74. As shown in FIG. 12, a head adjusting plate 75 is mounted on the rear of the frame 11 and is secured thereto by two mounting screws 76. Threadedly mounted in and extending through the plate 75 for engagement with the head mounting bracket 71 are a zenith adjusting screw 77, a rotation adjusting screw 78, an azimuth adjusting screw 79 and a locking screw 81. A coil spring 82 interconnects the hook 74 on the bracket 71 and a finger 83 depending from the plate 75 (FIG. 12) to urge the lower lefthand corner of the bracket 71 (righthand corner in FIG. 12) into engagement with the azimuth adjusting screw 79. As illustrated in FIG. 13, the azimuth adjusting screw 79 is shown as a single screw, but it will be appreciated that this may be a course adjusting screw which also has a fine adjusting screw within it, i.e., a compound screw. After assembly and initial mechanical adjustment, the magnetic head 69 is secured to the mounting bracket 71 with a suitable epoxy. The three screws 77-79 then provide for separate and individual fine adjustments of the bracket 71 and the head 69 relative to the frame 11 and its card guide means 21, 22 about three mutually perpendicular axes to assure accurate positioning of the head relative to the guide means and a card being guided thereby. Following any such fine adjustments of the head that may be required, the locking screw 81 is tightened and the screws 77-79 suitably secured in final position. Since the longitudinal flexure of the card 23 by the guide means 21, 22 also may tend to cause the card to warp or bow rearwardly between the center guide 25 and the right guide 22, it is desirable to provide means to prevent such card warping at a point substantially horizontally aligned with the magnetic head 69. To this end a U-shaped card backing pad 88 is mounted over the upper edge of the frame web 16 (FIGS. 1, 4 and 12) laterally intermediate the guides 22 and 25 with an adjusting screw 89 extending through the web to enable accurate front-to-rear positioning of its forward surface into the transverse plane defined by the forward face of the head 69.

In the operation of this magnetic card transport for effecting a two stage power driven cycle, a card 23 is inserted manually downwardly into the funnel 26 which guides the lower end thereof into the guide means 21, 22 and until it moves into contact with the card stop or finger 63 that is normally in its operative position of FIG. 4. A control key 91 (FIG. 14) subsequently actuated by the operator energizes the motor 37 and the solenoid 65 to cause rotation of the capstan shaft 45 and to swing the bracket 48 from its normal inoperative position of FIG. 4 to its operative position of FIG. 6. Since the card stop 63 is an integral part of the bracket 48, it is thus removed from the path of movement of the card. At the same time, the driven roller 46 on the end of the shaft 47 thus is carried forwardly (to the right in FIGS. 4 and 6) into engagement with the rotating capstan shaft 45. Such driving engagement of roller 46 and shaft 45 not only will rotate the shaft 47 and the driving roller 55, but also will cause downward movement of the roller 46 to tilt the shaft 47 from its normal horizontal inoperative position of FIG. 8 to the position illustrated in FIG. 9. That tilting of the shaft 47 is pivoted by the half-bearing 56, and limited adjacent the right end by the upper wall of the aperture 54 in the right side 53 of bracket 48. This tilting of shaft 47 moves its right end from its position in aperture 54 as shown in FIG. 5 to the upper full line position in FIG. 7 wherein it engages the upper surface of the aperture 54. That initial tilting of the shaft 47 causes the curved driving or pressure roller 55 not only to move the card downwardly by virtue of the clockwise rotation thereof as viewed in FIGS. 4 and 6, but also exerts lateral pressure against the card to maintain it in engagement with the right side guide 22 to insure proper alignment of the card with the magnetic head 69. It will be appreciated that this driving pressure of the roller 55 against the rear surface of the magnetic card 23 will be of a resilient nature by virtue of being transmitted through and by the spring 67, and that forward movement of the upper end of the bracket 48 will be limited by the card, the backing roller 34 and capstan shaft 45.

When the card 23 reaches the downward end of its useful travel, the direction of rotation of the motor 37 is reversed in a manner later to be described, while the solenoid 65 continues to be energized. Such reversal of the motor causes the capstan shaft 45 to lift the driven roller 46 and tilt the shaft 47 from its position of FIG.

Figure 11:
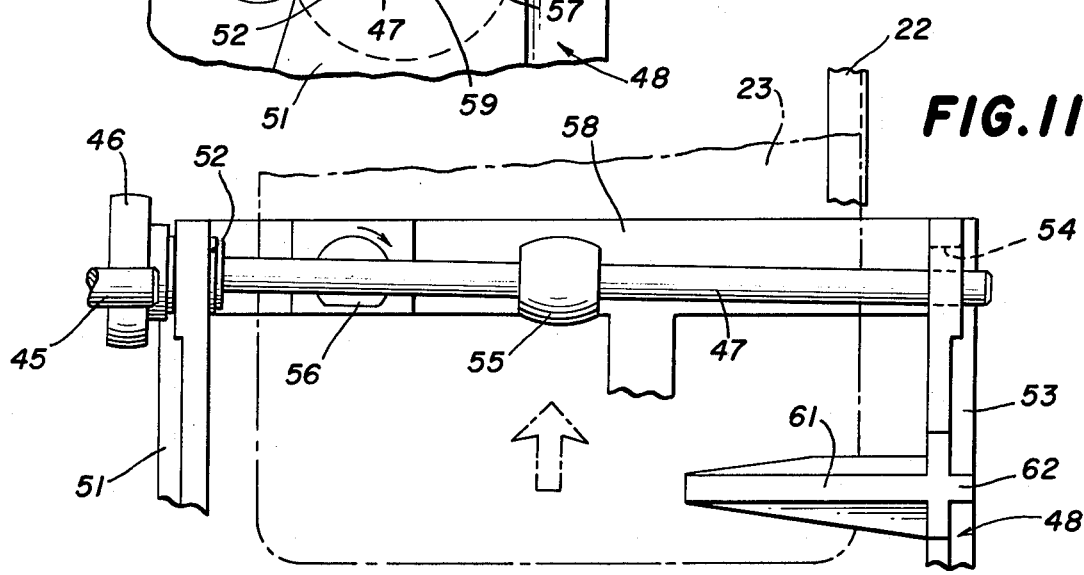
FIG. 11 is a view like FIG. 9 showing the shaft tilted with its left end up and its right end down in the position assumed during reverse or upward movement of the card.

9 to that of FIG. 11. As in the initial tilting of shaft 47, this is limited by the plastic bearing 52 adjacent the left end of the shaft and by the right end portion of the shaft engaging the lower surface of the aperture 54 which is the position thereof illustrated in broken lines in FIG. 7. This reverse rotation of the motor reversely rotates the curved roller 55 to cause it to move the card 23 upwardly while, at the same time, exerting a lateral pressure against it to insure proper edge engagement thereof with the right guide 22. The same edge of the card 23 thus will be maintained against the same guide means 22 during both longitudinal directions of travel of the card to insure accurate registration with the magnetic head 69. It also will be appreciated that the inherent stiffness of the magnetic card 23 coupled with the flexure thereof by the guide means 21, 22 will effect the desired low pressure contact of the rear or convex surface of the card with the magnetic head 69. As the card is returned upwardly to its initial starting position, the motor 37 and the solenoid 65 are deenergized which results in the upper end of the bracket 48 and the parts carried thereby being sprung rearwardly about the pivot pins 49 to bring the card stop 63 back to its operative position of FIG. 4.

As will be readily understood, the card 23 preferably comprises a polyester base 0.0075 inches thick with a matte finish on its forward surface capable of being written upon, and coated on its rear surface with magnetic oxide in well-known manner. This will be capable of normally remaining flat while being flexible enough to follow the curved pathway defined by the guides 21, 22 and maintain the desired low pressure contact with the head 69. Since the read and write controls for the head 69 are not a part of the present invention, however, they are not illustrated.

Referring to FIGS. 1, 2 and 14, the sequence of operations above described is controlled by a hole pattern in the card 23 and optical sensing means mounted on the frame 11 for cooperation therewith. The optical sensing means comprise a pair of optical switches 92 and 93, each including a light-emitting diode and a photoelectric transistor, mounted, respectively, adjacent the left and right guide means 21 and 22. The left switch 92 is disposed just above the upper surface of the card-limiting stop 61–63 when it is in effective position with the bracket 48 in normal inoperative position, so that proper placement of a card manually into the transport will block light transmission to the transistor to sense the presence of the card and render subsequent operation of control key 91 effective to cause erasure by head 69 of any recordings previously made on the rear side of the card, as represented by the broken line 94 in FIG. 1. On the other hand, if the adjacent corner 95 of card 23 has been cut off, as indicated in broken lines in FIG. 2, this left optical switch 92 will not be so actuated and the recorded track 94 will not be erased. The optical switch 93 at the right side is disposed somewhat higher than the switch 92 at a point below a marginal aperture 96 through the card 23 when the latter is inserted into the transport into engagement with the upper surface of the card-limiting stop 61–63, thereby blocking light transmission in switch 93 to prevent actuation thereof. However, should the card 23 be improperly inserted into the transport whereby the left (as seen in FIG. 2) instead of the right edge of the card is disposed opposite the optical switch 93, light transmission through a marginal aperture 97 in the card actuates switch 93, resulting in an error condition rendering operation of control key 91 ineffective.

With the reference to FIG. 14, which is a partial schematic diagram illustrating the control circuitry for the present invention, optical switch 93 comprises a light emitting diode 98 and a photoelectric transistor 99, the light emitting diode being energized from a power terminal 100 connected to a −17 v source, the anode of the diode being connected to ground. The photoelectric transistor 99 is operable, in response to the transmission of light in the optical switch 93, to provide a negative voltage from a −17 volt supply terminal 101, connected to its emitter, to the base terminal of a transistor 102 through a collector transistor 103. Transistor 102 is non-conductively biased to provide a −17 volt condition on an output lead 104 in response to the blockage of light transmission in the optical switch 93. However, when photoelectric transistor 99 is illuminated by the light emitting diode 98 in response to backward insertion of card 23 into the transport, the negative voltage supplied by that transistor to the base of transistor 102 serves to conductively operate the latter in a known manner, thereby causing its output lead 104 to assume a 0 volt error condition, which is supplied to a logic circuit 105 to prevent operation of the transport.

When a properly positioned card 23 is inserted into the transport, light transmission through the optical switch 93 is initially blocked. The logic circuit actuates a solenoid control circuit 106 (FIG. 14) through a control line 107, the solenoid control circuit being operable to energize solenoid 65 from a +13 volt power input terminal 108 and a −17 volt power input terminal 109 through lines 111 and 112. The energization of solenoid 65 serves to enable downward movement of the card 23 by the motor 37, which is controlled by the logic circuit 105, in response to actuation of the control key 91, through control lines 113 and 114 connected to a motor control circuit 115, the latter being operable to directionally control the energization of motor 37 by proper energization thereof from a +13 volt terminal 116 and a −17 volt terminal 117.

Upon partial downward movement of the properly positioned card 23, the transmission of light through the optical switch 93 upon alignment thereof with the marginal aperture 96 will provide a 0 volt condition or signal on line 104, which is ignored by the logic circuitry 105. When the card 23 is moved by the motor 37 through the extent of its downward travel, an elongated aperture 118 (FIG. 2) in the card 23 will reach a point in alignment with the optical switch 93 to effect light transmission therethrough, thereby causing a 0 volt condition or signal on lead 104, which actuates the logic circuitry 105 to effect reversal of the motor 37 by reversing its supply connections. The aperture 118 is elongated to provide coasting time for the motor and driven parts. The resulting return cycle or upward card translation is terminated in response to a subsequent signal on lead 104 by switch 93 when aperture 96 returns into alignment therewith, which effects deenergization of motor 37 and solenoid 65.

The embodiments of the invention in which an exclusive property or privilege is claimed are defined as follows:

1. A magnetic card transport, comprising a frame having curved guide means with an outer convex side and an inner concave side for receiving a flat flexible magnetic card for longitudinal translation relative thereto and flexing said card to a predetermined curvature, a magnetic head, means for mounting said head rigidly on said frame on the outer convex side of said guide means whereby effective low contact pressure with said card in said guide means as imposed solely by the latter and said flexed card, and card translating means for imparting longitudinal translation of said card relative to said guide means, which includes a driving roller, a shaft supporting said roller, a bracket supporting said shaft, means pivotally mounting said bracket on said frame and means for swinging said bracket from an inoperative position spaced from said card to an operative position engaging said driving roller with said card.

2. A magnetic card transport according to claim 2, wherein said card translating means includes a reversible motor and said driving roller contacts said card to effect longitudinal translation thereof according to the direction of rotation of said motor and said card translating means includes means operable during longitudinal translation in either direction to maintain the same longitudinal edge of said card in engagement with said guide means to insure proper registry of said card with said head.

3. A megnetic card transport according to claim 2, wherein said card translating means includes a motor, drive means rotated by said motor, and a driven roller mounted on said shaft, whereby swinging of said bracket from inoperative to operative position engages said driven roller with said drive means.

4. A magnetic card transport according to claim 3, wherein said motor is reversible, said bracket is provided with a half-bearing and apertures larger than the diameter of said shaft for receiving and limiting pivotal movements thereof about said half-bearing, and said driving roller has a curved peripheral surface, whereby engagement of said driven roller with said drive means will tilt said shaft about said half-bearing to cause said curved driving roller while translating said card in either longitudinal direction to maintain the same longitudinal edge of said card in engagement with said guide means to insure proper registry of said card with said head.

5. A magnetic card transport according to claim 3, wherein said bracket includes a stop means disposed, when said bracket is in said inoperative position, in the path of said card to limit manual insertion thereof to a start position and movable out of the path of said card when said bracket is swung to operative position.

6. A magnetic card transport according to claim 8, wherein said means for swinging said bracket from inoperative to said operative position comprises a solenoid mounted on said frame and a spring interconnecting said solenoid and said bracket.

7. A megnetic card transport according to claim 1, wherein said translating means includes a reversible motor, and said shaft has self-pivoting means supporting said driving roller and mounted for limited tilting in opposite directions in response to opposite rotations of said motor, said driving roller having a curved peripheral surface, whereby said driving roller will maintain the same longitudinal edge of said card in engagement with said frame while moving said card longitudinally in either direction to insure proper registry of said card with said head.

8. In a magnetic card transport according to claim 1, a card funnel of plastic with integral feet for snap-fitting engagement on said frame and defining an aperture for receiving an end of said card and directing it into said guide means.

9. A magnetic card transport according to claim 8, wherein said driving roller engages with one surface of the card and said card translating means further includes a backing roller engaging the other surface of the card opposite said driving roller.

10. A magnetic card transport according to claim 9, wherein said backing roller is centrally mounted on a stub shaft, said frame is provided with open slots for receiving said stub shaft and backing roller, and fingers depending from said funnel for retaining the ends of said stub shaft in said slots.

11. A magnetic card transport, comprising a frame having guide means for receiving and guiding a card in a predetermined pathway, a magnetic head mounted on said frame for cooperation with said card as the same moves along said pathway, and card translating means including a reversible motor, and a driving roller rotated thereby and means mounting said driving roller for movement into contact with a main surface of said card to effect longitudinal translation thereof along said pathway according to the direction of rotation of said motor said mounting means orienting said driving roller during such longitudinal translation in either direction to apply a lateral guiding force to maintain the same longitudinal edge of said card in engagement with said guide means to insure proper registry of said card with said head wherein said card translating means includes a shaft carrying said driving roller, a bracket loosely supporting said shaft, a half-bearing engaged by said shaft, and means for moving said bracket to effect said contact of said driving roller with said card and tilting of said shaft about said half-bearing as a fulcrum.

12. A magnetic card transport according to claim 11, wherein said driving roller has a curved peripheral surface.

* * * * *

UNITED STATES PATENT OFFICE
CERTIFICATE OF CORRECTION

PATENT NO. : 3,946,438
DATED : March 23, 1976
INVENTOR(S) : Bert Lane Altmann, Robert Milton Gregg and Norman Frank Gioia It is certified that error appears in the above—identified patent and that said Letters Patent are hereby corrected as shown below:

Col. 3, line 44, after "24" insert --at--.

Col. 9, claim 2, line 1, "2" at the end of the line should be --1--.

Col. 9, claim 3, line 1, "2" should be --1--.

Col. 9, claim 6, line 1, "8" should be --5--.

Signed and Sealed this eighth Day of June 1976

[SEAL]

Attest:

RUTH C. MASON
Attesting Officer

C. MARSHALL DANN
Commissioner of Patents and Trademarks